US005813165A

United States Patent [19]
Dougherty, Sr.

[11] Patent Number: 5,813,165
[45] Date of Patent: Sep. 29, 1998

[54] BIODEGRADABLE SNAKE TRAP

[76] Inventor: Franklin Wayne Dougherty, Sr., 6020 Longwood La., Beaumont, Tex. 77707

[21] Appl. No.: 852,056

[22] Filed: May 6, 1997

[51] Int. Cl.[6] .................................................. A01K 83/06
[52] U.S. Cl. ................................ 43/58; 43/42.06; 43/43.1
[58] Field of Search .................................... 43/58, 87, 10, 43/7, 124, 77, 4, 42.06, 43.1; 426/1; 195/127

[56] References Cited

U.S. PATENT DOCUMENTS

| | | | |
|---|---|---|---|
| 3,958,357 | 5/1976 | Frank | 43/42.06 |
| 3,987,205 | 10/1976 | Stephen | 426/1 |
| 3,990,173 | 11/1976 | Barone | 43/77 |
| 4,477,992 | 10/1984 | Lang et al. | 43/4 |
| 5,174,058 | 12/1992 | Boyer | 43/44.8 |
| 5,216,829 | 6/1993 | Morton | 43/42.06 |

*Primary Examiner*—Joseph J. Hail, III
*Assistant Examiner*—Anthony Ojini
*Attorney, Agent, or Firm*—Arnold, White & Durkee

[57] ABSTRACT

A biodegradable snake trap 10 suitable for deployment from an aircraft is disclosed, comprising a hook 12 with line 14 attached, embedded in an egg 16. The egg 16 is encased in a frozen fluid 20 and disposed within container 18, to protect the egg 16. The snake trap 10 is dropped from an aircraft flying over the area in which the trap is to be deployed. A grapple 24 hooks onto tree limbs to prevent the snake trap from falling to the ground, and descent restrictor 26 slows the rate of descent of the trap. When the frozen fluid 20 melts, the container 18 falls away and exposes the egg 16, attracting snakes. When a snake swallows and crushes the egg 16, the hook 12 lodges in the snake's vital organs and kills the snake.

18 Claims, 1 Drawing Sheet

BIODEGRADABLE SNAKE TRAP

BACKGROUND OF THE INVENTION

1. Field of the Invention

The present invention relates generally to animal traps and, more particularly, to an biodegradable snake traps.

2. Description of the Related Art

Brown tree snakes have become so numerous on the island of Guam as to pose a significant problem for Guam's native birds and human inhabitants. The snake population has been estimated as high as 2,000 to 3,000 snakes per acre. The snakes have devastated the bird life in Guam by consuming the bird's eggs, and are causing problems for the human inhabitants by shorting out power lines, infesting plumbing systems, and causing similar problems. Due to the dense vegetation and lack of ground access to many areas of Guam, the eradication of the brown tree snake poses a difficult problem.

Previously known traps have included cages into which wildlife is lured. However, such traps are heavy, bulky, and fragile, and must be set in position by ground crews, limiting their use to areas reasonably accessible from the ground and increasing the time and cost required to deploy the traps. They are also expensive to manufacture, and many designs require maintenance to remove dead snakes and reset the trap. This type of trap also tends to capture wildlife other than the species intended. Furthermore, the materials used to construct these types of traps are not biodegradable and so the traps must be retrieved when no longer required to prevent pollution to the environment and injury to people and wildlife.

Other types of traps include jaws that spring shut. These traps also suffer from many of the same drawbacks. They must be deployed from the ground, require maintenance to remove dead snakes and reset the jaws, and often pose a threat to people and wildlife other than snakes. Traps which use poison, while overcoming some of the shortcomings discussed above, pose a hazard to human inhabitants and non-snake wildlife that prevents their use in many applications.

SUMMARY OF THE INVENTION

Thus, the previously known devices and methods of eradicating snakes suffer from a number of drawbacks that have limited their effectiveness when used in remote areas. The present invention addresses these problems by providing a snake trap that is very inexpensive to make, requires no maintenance, is constructed of biodegradable materials, can be readily deployed in remote regions from an aircraft, and will have a minimal effect on non-snake wildlife.

In accordance with one aspect of the invention, there is provided an apparatus for trapping snakes, the apparatus comprising a portion of bait for attracting snakes, a hook at least partly embedded in the bait, and a line attached to the hook. In accordance with another aspect of the invention, there is provided an apparatus for trapping snakes, the apparatus comprising an egg, a hook at least partly embedded in the egg, a line with one end attached to the hook and the other end attached to a grapple, a frozen fluid encasing the egg, and a container for the egg encased in the frozen fluid.

In accordance with another aspect of the invention, there is provided a method of trapping snakes comprising the steps of providing a portion of bait for attracting snakes, providing a hook, providing a line having a first end and a second end, attaching the first end of the line to the hook, placing at least a portion of the hook inside the bait, and restricting the movement of the second end of the line.

BRIEF DESCRIPTION OF THE DRAWINGS

The features and advantages of the present invention will be best appreciated upon reference to the following detailed description and the accompanying drawings.

Figure 1:
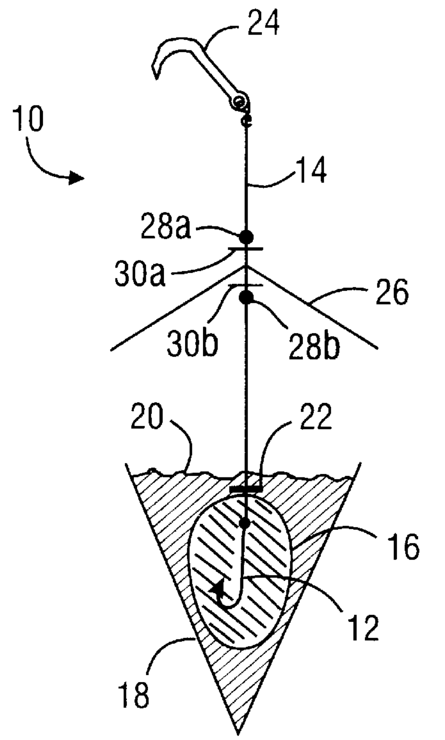
FIG. 1 is a diagram of an illustrative embodiment of the invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF ILLUSTRATIVE EMBODIMENTS

Turning now to the drawings and referring initially to FIG. 1, a diagram of an illustrative embodiment of the invention is shown. The snake trap 10 includes a hook 12, with a line 14 tied to the eye of the hook 12. A puncture is made in the small radius end of the egg 16, and the hook 12 is inserted into the egg 16. The hook 12 may be fully inserted into the egg 16 or may be partially inserted so that the eye of the hook protrudes from the egg 16.

The puncture in the egg 16 is sealed with glue, wax, sticky tape, or some other sealing material 22, to prevent the fluid 20 from entering the egg 16 and to prevent the contents of the egg from leaking out. The egg 16 is positioned in the container 18, water or other fluid 20 is poured into container 18 so that the egg 16 is covered, and the fluid 20 is then frozen. The container 18 and frozen fluid 20 protect the egg 16 from damage during transport and deployment of the trap. The line 14 may be looped into the fluid 20 before it is frozen to more firmly anchor the line in the frozen fluid and to reduce the stress on the egg 16 caused by tension on the line 14.

The hook 12 may be a fishing hook and line 14 may be a fishing line, both of the type commonly used by fishermen and readily available at fishing supply stores. The sizes of the hook 12 and line 14 are selected to suit the size of snake desired to be trapped. A no. 4 size hook and 20 lb line has been found suitable for trapping three foot snakes. The hook 12 may be constructed of carbon steel or other material which will readily biodegrade without polluting the environment. The line 14 may be comprised of nylon, rayon, cotton, or other suitable biodegradable material. The container 18 may be a paper cup of the type commonly used for dispensing water from drinking fountains, or may be comprised of any other suitable biodegradable material.

A grapple 24 is attached to line 14 at the end opposite the hook 12. The grapple 24 is shaped to catch onto tree limbs or other vegetation, and may be made of wood, stiff cardboard, or other suitably strong biodegradable material. A cone shaped descent restrictor 26 is attached to the line 14 at a midpoint on the line. The descent restrictor 26 is prevented from sliding along the length of the line 14 by beads 28a and 28b and stops 30a and 30b. Beads 28a and 28b are spherical beads with a hole through the center. Line 14 is threaded through holes in beads 28a and 28b and knotted or glued to prevent the beads from moving along line 14. Alternatively, the beads 28a and 28b, if made from a suitable material such as aluminum, could be crimped to the line 14. Stops 30a and 30b are flat circular members with a hole through the middle though which line 14 is threaded. Stop 30a is positioned between bead 28a and descent restrictor 26, and stop 30b is positioned between bead 28b and descent restrictor 26. Beads 28a and 28b may be made of wood, cardboard, or other suitable biodegradable material, and stops 30a and 30b may be made of stiff cardboard or other suitable biodegradable material.

Figure 2:
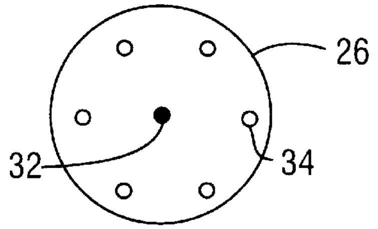
FIG. 2 is a plan view of the descent restrictor used in the embodiment of FIG. 1.

FIG. 2 is a plan view of the descent restrictor 26, showing the hole 32 through which the line 14 runs. Additional vent holes 34 may also be included to permit a limited amount of air to flow through the descent restrictor 26 to stabilize it during descent. The descent restrictor 26 may be made of stiff cardboard or other suitable biodegradable material.

The snake trap 10 is designed to be dropped from an aircraft. The cone shaped container 18, weighted with the egg 16 and frozen fluid 20, falls with the point of container 18 towards the ground. The cavity of the descent restrictor 26 catches air as the snake trap 10 descends, slowing the rate of descent. When the snake trap 10 nears the ground, the grapple 24 catches on any tree limbs or other vegetation and prevents the snake trap from hitting the ground. The snake trap 10 dangles above the ground, and the frozen fluid 20 melts causing the container 18 to fall to the ground, thus exposing the egg 16 to the air.

As the temperature of the egg 16 increases, the spoilage scent increases, attracting snakes to the trap. A snake, attracted by the smell, will swallow the egg 16 whole. The shell of the egg 16 is pierced by spines inside the snake's throat, and then crushed by the snake's muscle contractions. The hook 12 is thus exposed to the snake's lungs, which extend from the snake's windpipe to about half way down its body, and the snake's heart, which is located a short distance behind the neck vertebrae. The hook 12 pierces the snake's lungs, heart or both. When the snake is first hooked it moves about fiercely, causing the line 14, fixed by the grapple 24 hooked onto a tree limb, to pull on the hook 12 embedded in the snake's organs, causing further injury and quickly killing the snake.

Figure 3:
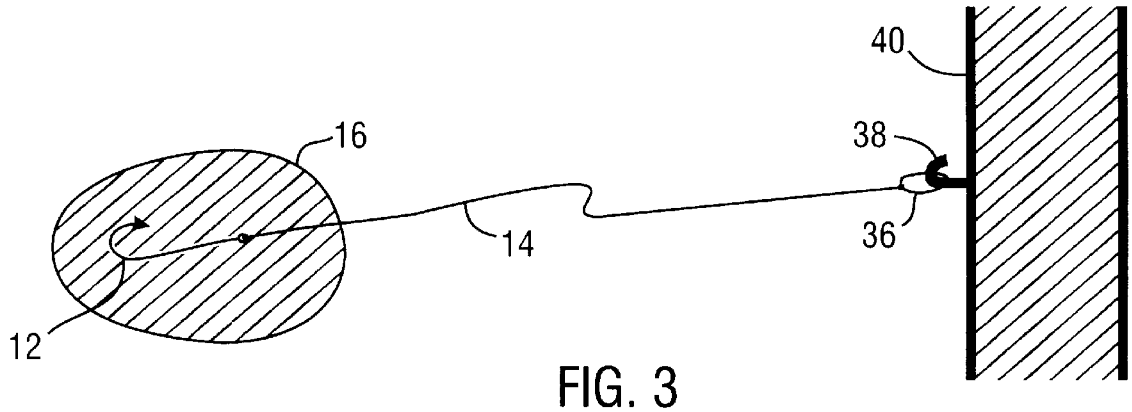
FIG. 3 is a diagram of an alternative embodiment of the invention.

FIG. 3 shows an alternative embodiment of the invention, designed to be deployed on the ground. The hook 12, line 14, and egg 16 are of the same design and construction as described above. However, line 14 is attached to a second hook 38, which is connected to a fixed object 40, such as a tree or stake. Alternatively, the line 14 may be tied around the fixed object 40 or ties to a heavy object such as a large rock. The snake trap of FIG. 3 operates similarly to the snake trap of FIG. 1, except that line 14 is immobilized by the fixed object 40 rather than the grapple 24.

Many modifications and variations may be made in the techniques and structures described and illustrated herein without departing from the spirit and scope of the present invention. Accordingly, it should be understood that the methods and apparatus described herein are illustrative only and are not limiting upon the scope of the present invention.

What is claimed is:

1. An apparatus for trapping snakes, the apparatus comprising:

a) bait for attracting snakes;

b) a hook at least partly embedded in the bait;

c) a line having a first end and a second end, the first end being attached to the hook and the second end extending outside the bait and attached to an attachment device; and d) a frozen fluid encasing the bait.

2. An apparatus as defined in claim 1 wherein the bait comprises an egg.

3. An apparatus as defined in claim 2 further comprising a seal adapted to seal the egg where the hook or line penetrates the egg.

4. An apparatus as defined in claim 1 wherein the apparatus comprises biodegradable materials.

5. An apparatus as defined in claim 1 further comprising:

d) a grapple attached to the second end of the line.

6. An apparatus as defined in claim 1 further comprising:

e) a container configured to house the bait and the frozen fluid.

7. An apparatus as defined in claim 6 further comprising:

e) an attachment device connected to the second end of the line.

8. An apparatus as defined in claim 7 wherein the container comprises an inverted cone.

9. An apparatus as defined in claim 8 wherein the container is adapted to release from the bait upon melting of the frozen fluid.

10. An apparatus as defined in claim 7 further comprising:

f) a descent restrictor for slowing the rate of fall of the apparatus through the air.

11. An apparatus as defined in claim 10 wherein the apparatus comprises biodegradable materials.

12. A method of trapping snakes, the method comprising:

a) providing a snake trap comprising a hook embedded in an egg and providing an attachment device connected to the hook; and b) releasing the snake trap from an aircraft flying over an area in which snakes are generally located so that the snake trap drops into the area.

13. A method as defined in claim 12 wherein the snake trap comprises:

a) a hook embedded in an egg; and b) a line connecting the hook to a grapple.

14. A method as defined in claim 13 wherein the snake trap further comprises:

c) a frozen fluid encasing the egg.

15. A method as defined in claim 14 wherein the snake trap comprises biodegradable materials.

16. A method of trapping snakes comprising:

a) mounting a hook in a bait for attracting snakes;

b) attaching a first end of a line to the hook, and attaching the second end of the line to an attachment device;

c) encasing the hooked bait within a frozen fluid; and d) deploying the encased, hooked bait and line in an area in which the snakes are generally located.

17. A method as defined in claim 16 wherein the step of deploying comprises releasing the encased, hooked bait and line from an aircraft flying over the area in which the snakes are generally located.

18. A method as defined in claim 17 wherein the bait, hook, and line comprise biodegradable materials.

* * * * *